United States Patent [19]
Morales

[11] Patent Number: 5,259,636
[45] Date of Patent: Nov. 9, 1993

[54] BICYCLE FRAME HAVING TRIANGULAR REINFORCEMENT

[75] Inventor: Bob Morales, Huntington Beach, Calif.

[73] Assignee: Bike Rack, Inc., Hauppauga, N.Y.

[21] Appl. No.: 925,125

[22] Filed: Aug. 6, 1992

[51] Int. Cl.⁵ ............................................. B62K 3/04
[52] U.S. Cl. ............................................. 280/281.1
[58] Field of Search ................................. 280/281.1

[56] References Cited
FOREIGN PATENT DOCUMENTS
877549 12/1942 France ........................... 280/281.1

Primary Examiner—David M. Mitchell
Assistant Examiner—Andrew C. Pike
Attorney, Agent, or Firm—Cislo & Thomas

[57] ABSTRACT

A bicycle frame includes a top support tube extending rearwardly to a welded connection with a rear fork structure. The rear fork structure has another welded connection with an upstanding seat tube. Aligned holes are formed in the top support tube so that the seat tube can extend downwardly through the openings; the seat tube is welded to the top support tube at the aligned openings. The various tubes are arranged and proportioned to provide a welded triangular reinforcement designed to diffuse and absorb road impact forces generated at the rear wheel of the bicycle.

8 Claims, 1 Drawing Sheet

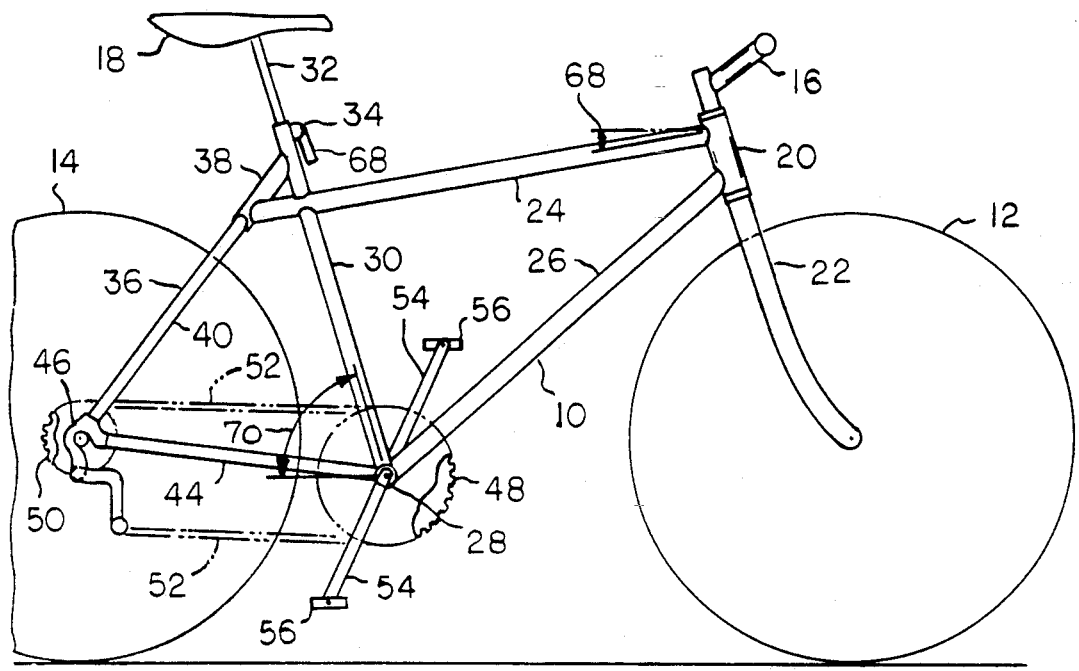
FIG. 1
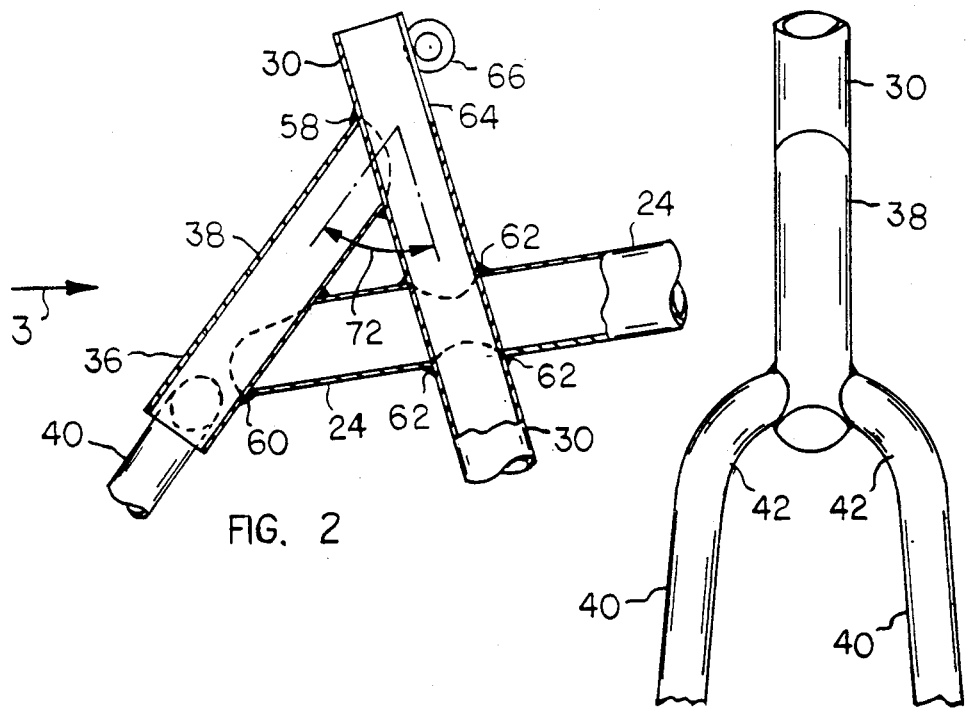
FIG. 2
FIG. 3

BICYCLE FRAME HAVING TRIANGULAR REINFORCEMENT

BACKGROUND OF THE INVENTION

1. Field of the Invention

This invention relates to bicycles, and especially to bicycle frames.

2. Prior Developments

Bicycles commonly have frames formed out of metal tubes welded together to form a relatively light frame construction designed to interconnect the front and rear wheels, while provided a support mechanism for the bicycle seat and handlebars.

A typical bicycle frame will comprise a relatively short upstanding front suspension tube adapted to receive the front fork structure for the front wheels, an elongated top support tube extending rearwardly from the front suspension tube, an elongated diagonal tube extending rearwardly and downwardly from the front suspension tube below the top support tube, and an elongated upstanding seat tube extending between the rear ends of the top tube and diagonal tube. A sprocket axle housing is located at the connection point between the diagonal tube and the upstanding seat tube.

The above-mentioned tubes are welded together so as to form a generally triangular frame structure, when viewed in side elevation.

The rear wheel of the bicycle has an axle that is supported in a bearing structure extending transversely between the connected ends of two rear fork structures located behind the above-mentioned triangular frame. One of the fork structures extends generally horizontally from the aforementioned sprocket axle housing. The other fork structure extends angularly downwardly from the upper end of the upstanding seat tube. The two rear fork structures cooperate with the elongated seat tube to form a second triangular frame. The elongated seat tube constitutes a common element of both triangular frames.

Bicycle frames are constructed so as to be as light as possible, while at the same time being relatively stiff and rigid. In some situations however, the bicycle frame is subject to premature failure, especially when the bicycle is used for acrobatic maneuvers that produce high impact forces between the terrain and the bicycle wheels. Shock forces can be alleviated to a certain extent by providing shock absorbers in the front wheel suspension. However, such shock absorbers do not absorb impact forces generated at the rear wheel.

The present invention is concerned with a bicycle frame that is relatively light, but is nevertheless relatively rigid and resistant to shock impact forces, especially forces generated by forcible impact of the bicycle rear wheel against the terrain surface. The construction, according to the invention, alleviates lateral as well as vertical flex of the frame, which may sometime pose a problem for the bicycle rider in the case of the conventional.

SUMMARY OF THE INVENTION

A bicycle frame of the present invention comprises an elongated upstanding seat tube, an elongated top support tube, and an upper rear fork structure joined together to provide a reinforced joint, whereby impact forces generated at the bicycle rear wheel are effectively resisted without breakage or bending of the bicycle frame.

In forming the reinforced joint the rear fork structure has its upper end and welded to the upstanding seat tube near the tube upper end. The seat tube extends downwardly through aligned openings in the top support tube, such that the support tube crosses the seat tube to have a second welded connection with the fork structure. Annular welds are formed at the joints between the seat tube and the aligned openings in the top support tube.

The multiple weld connections between the rear fork structure, seat tube, and top support tube form a triangular reinforcement for the frame, such that impact forces transmitted from the axle of the rear wheel through the rear fork structure are effectively resisted.

THE DRAWINGS

FIG. 1 is a side elevational view of a bicycle having a frame constructed according to the teachings of the present invention.

FIG. 2 is an enlarged fragmentary sectional view of a structural connection used in the FIG. 1 bicycle frame, forming substantially an 'A'-shaped section.

FIG. 3 is a fragmentary end elevational view of the FIG. 2 construction taken generally in the direction of arrow 3 in FIG. 2.

DESCRIPTION OF A PREFERRED EMBODIMENT OF THE INVENTION

The drawings illustrate a bicycle that comprises a frame 10, front wheel 12, rear wheel 14, handlebars 16, and seat 18. Frame 10 is formed out of metal tubes welded together to form a rigid one-piece structure. The frame includes an upstanding front suspension tube 20 adapted to swivably receive a stem that extends upwardly from a front fork structure 22 for front wheel 12. Handlebars 16 are suitably attached to the upper end of the stem, whereby the rider can steer the bicycle by hand pressure on the handlebars.

Extending rearwardly from front suspension tube 20 is an elongated top support tube 24. An elongated diagonal support tube 26 extends downwardly and rearwardly from tube 24 directly below top tube 20. At its rear end tube 26 is welded to a sprocket axle housing 28 that extends transverse to the general plane of the bicycle frame.

An elongated upstanding seat tube 30 has its lower end welded to housing 28 and to the rear end of diagonal tube 26. The upper end portion of tube 30 is left open to telescopically receive the mast (post) 32 for seat 18. A suitable quick-release clamp 34 is mounted on the upper end portion of tube 30 for clamping post 32 in selected positions of adjustment for controlling the height of seat 18.

Seat tube 30 extends through aligned openings in top support tube 24, such that the two tubes are rigidly connected together, as by welding. Tube 24 extends rearwardly beyond tube 30 to connect with an upper rear fork structure 36. Fork structure 36 comprises a relatively short tubular strut 38 extending downwardly from a welded connection with seat tube 30. Two spaced tubular arms 40 have curved upper end portions 42 (FIG. 3) welded to opposite side surfaces of strut 38, whereby the spaced arms are enabled to extend diagonally downward alongside rear wheel 14.

A lower rear fork structure 44 has its front end welded to sprocket axle housing 28 and its rear end connected to the lower end of fork structure 36. Fork structure 44 comprises two spaced arms similar to the tubular arms 40 of fork structure 36. The connection between the two fork structures comprises two transversely spaced brackets 46 having end portions telescoped into the tubular arms that define the two fork structures, as under conventional practice.

The propulsion system for the bicycle is conventional. As schematically shown in the drawing, the system comprises a front sprocket means 48, rear sprocket means 50, and an endless drive chain 52. The axle for sprocket means 48 carries two crank arms 54 that mount foot pedals 56. In practice, each sprocket means 48 or 50 comprises an array of different diameter sprockets. A conventional derailleur mechanism is provided for shifting the drive chain between different sets of sprockets, whereby different crank-wheel speed ratios can be utilized.

The present invention is concerned especially with the connection between top support tube 24, upstanding seat tube 30, and upper rear fork structure 36. As shown best in FIG. 2, the upper end of tubular strut 38 is welded, as at 58, to seat tube 30 at a point near the seat tube upper end. The rear end of top support tube 24 has a second weld connection 60 with strut 38 at a point below weld connection 58.

The diameter of tube 24 has about the same diameter as tube 30 and strut 38; tube 30 and strut 38 preferably have the same diameter (smaller than that of tube 24). Two aligned holes (openings) are formed in tube 24 near its rear end, whereby seat tube 30 can extend through the aligned openings without destroying the structural integrity of tube 24. Annular welds 62 are formed around the circumference of tube 30 at the aligned holes in tube 24, such that a third weld connection is provided between tubes 24 and 30.

The three weld connections 58, 60, and 62 are spaced apart so as to form a triangular reinforcement for frame 10 (as viewed in FIG. 2). Each weld connection 58, 60, or 62 extends entirely around the circumference of the respective tube 38, 24 or 30. Each tube 38, 24, or 30 has a circular cross section.

The aforementioned post 32 and clamp mechanism 34 are not shown in FIG. 2. The clamp action involves gripment of tube 30 on the post. A vertical slit 64 is formed in tube 30. Two aligned annular lugs 66 are welded to tube 30 alongside the slit for reception of a clamp screw (not shown); a manual lever 68 (FIG. 1) is attached to the screw, whereby rotation of the lever causes the screw to draw lugs 66 toward each other to produce the desired clamping of tube 30 on mast 32.

The various tubes are proportioned so that tube 24 is slightly longer than tube 30. Tube 24 slopes downwardly and rearwardly at an angle 68 that measures approximately ten degrees (referenced to a horizontal plane). Seat tube 30 has an inclination angle 70 of about seventy-three degrees. Tubular strut 38 is angled to seat tube 30 at an angle 72 (FIG. 2) that measures approximately fifty-two degrees. These angular relationships are believed to produce an optimum frame construction, as regards its ability to handle high impact forces generated at the rear wheel 14.

The illustrated bicycle is intended for use as a mountain bike or all-terrain bike, wherein the rider causes the bike to become airborne during aerobatic maneuvers. Relatively high ground impact forces are generated at the front and rear wheels of the bicycle. Shock absorbers can be built into the front fork structure to absorb impact forces at the front wheel. However, the impact forces generated at the rear wheel have to be absorbed by frame 10. The triangular frame reinforcement shown in FIG. 2 is intended to diffuse and absorb high impact forces. Forces travelling upwardly through fork structure 36 are resisted by two separate weld connections 58 and 60. These two weld connections are indirectly reinforced by the third weld connection 62. Thus, each of the three tubes 38, 30, and 24 act as mutual reinforcements for the other two tubes, such that the weld connections retain their integrity under relatively high load forces.

In forming the various weld connections 58 and 60 the ends of the respect tubes 38 and 24 are made to have concave configurations mated to the surface contour on the associated tube 30 or 38, whereby the entire end edge of the abutting tube is engaged with the associated circular tube surface. The welds are relatively large area welds having considerable strength.

The ten degree slope of tube 24 advantageously causes tube 24 to cross tube 30 at a point below weld connection 58, whereby different areas of tube 38 can be used for the two welded connections 58 and 62. The ten degree downslope of tube 24 also provides a convenient space for accommodating clamping lever 68 (FIG. 1).

The drawings necessarily show a specific form of the invention. However, it will be appreciated that the invention can be practiced in other forms.

What is claimed is:

1. A bicycle frame comprising an upstanding front suspension tube; an elongated upstanding seat tube spaced rearwardly from said front tube, said elongated seat tube having an upper end and a lower end; a sprocket axle housing connected to the lower end of said seat tube; an elongated diagonal support tube having a front end connected to said front suspension tube and a rear end connected to said axle housing; an upper rear fork structure having an upper end and a lower end; a first welded connection between the upper end of the upper rear fork structure and the seat tube at a point near the seat tube upper end; a lower rear fork structure having a front end connected to said axle housing and a rear end connected to the lower end of said upper rear fork structure; and an elongated top support tube having a front end and a rear end; the front end of said top support tube being connected to said front suspension tube; the rear end of said top support tube having a second welded connection to said upper rear fork structure at a point below the first welded connection; said top support tube having two aligned openings therein near the rear end thereof; said elongated seat tube extending through said aligned openings; said support tube having a third welded connection with said seat tube at said aligned openings; the three welded connections being spaced apart so as to form a triangular reinforcement for the frame.

2. The bicycle frame of claim 1, wherein said elongated seat tube has a circular cross section; said top support tube has a circular cross section; and a diameter of said seat tube is smaller than a diameter of the top support tube so that the seat tube can extend through the aligned openings in the top support tube without destroying the structural integrity of said top support tube.

3. The bicycle frame of claim 1, wherein the top support tube is slightly longer than the elongated seat tube.

4. The bicycle frame of claim 1, wherein the top support tube slopes downwardly and rearwardly at an angle of approximately ten degrees.

5. The bicycle frame of claim 1, wherein said upper rear fork structure comprises a relatively short tubular strut extending downwardly from said first welded connection, and two spaced arms having curved upper end portions welded to side portions of a surface of said tubular strut.

6. The bicycle frame of claim 5, wherein said upper rear fork structure is angled to said seat tube at an angle of about fifty-two degrees.

7. The bicycle frame of claim 6, wherein the seat tube has an inclination angle of approximately seventy-three degrees.

8. The bicycle frame of claim 5, wherein said tubular strut has a circular cross section; said top support tube has a circular cross section; a diameter of said tubular strut is smaller than a diameter of the top support tube; the rear end of said top support tube has a concave edge configuration mated to a surface contour of the tubular strut whereby substantially an entire end edge of the top support tube is engaged with the strut surface; and said second welded connection is an annular weld extending around a circumference of the top support tube.

* * * * *